(12) United States Patent
Maupin et al.

(10) Patent No.: US 10,765,251 B2
(45) Date of Patent: Sep. 8, 2020

(54) METHOD AND APPARATUS FOR CONTINUOUS PRESSURE COOKING

(71) Applicant: Lyco Manufacturing Inc., Columbus, WI (US)

(72) Inventors: Daniel D. Maupin, Corvallis, OR (US); Steven J Schultz, Beaver Dam, WI (US)

(73) Assignee: Lyco Manufacturing Inc., Columbus, WI (US)

(*) Notice: Subject to any disclaimer, the term of this patent is extended or adjusted under 35 U.S.C. 154(b) by 213 days.

(21) Appl. No.: 15/980,421

(22) Filed: May 15, 2018

(65) Prior Publication Data

US 2018/0325300 A1 Nov. 15, 2018

Related U.S. Application Data

(60) Provisional application No. 62/506,566, filed on May 15, 2017.

(51) Int. Cl.
| | |
|---|---|
| *A47J 27/08* | (2006.01) |
| *A47J 27/00* | (2006.01) |
| *A23L 3/015* | (2006.01) |
| *A23L 5/10* | (2016.01) |
| *A23L 3/00* | (2006.01) |
| *A23B 7/06* | (2006.01) |

(Continued)

(52) U.S. Cl.
CPC .......... *A47J 27/0802* (2013.01); *A23L 3/015* (2013.01); *A23L 3/0155* (2013.01); *A23L 5/17* (2016.08); *A47J 27/002* (2013.01); *A47J 27/0817* (2013.01); *A23B 7/06* (2013.01); *A23L 3/001* (2013.01); *A23N 12/04* (2013.01); *A23N 12/06* (2013.01)

(58) Field of Classification Search
CPC . A23N 12/04; A23N 12/06; A23B 7/06; A47J 27/16
See application file for complete search history.

(56) References Cited

U.S. PATENT DOCUMENTS

| | | | |
|---|---|---|---|
| 4,073,226 A * | 2/1978 | Shulz | A23L 3/04 198/729 |
| 4,665,810 A * | 5/1987 | Falck | A47J 27/16 99/348 |
| 6,105,485 A | 8/2000 | Zittel | |

(Continued)

*Primary Examiner* — Jason L Vaughan
(74) *Attorney, Agent, or Firm* — George R. Carrigan

(57) ABSTRACT

A method and apparatus for continuous pressure cooking product includes a pressure cooking section, an isolating chamber, and an output section. A first product and fluid valve is between the pressure cooking section and the isolating chamber. A second product and fluid valve is between the isolating chamber and the output section. A fluid valve is between a source of pressurized fluid and the isolating chamber. Product is provided to the pressure cooking section and cooked. The fluid valve is opened so that the isolating chamber becomes substantially the same pressure as the pressure cooking section. The first controllable product and fluid flow valve is opened and product enters the isolating chamber, and then closed to isolate product in chamber. The second controllable product and fluid valve is opened and product moves from the chamber to the output section. Then the second controllable product and fluid valve is closed.

20 Claims, 5 Drawing Sheets

(51) Int. Cl.
*A23N 12/04* (2006.01)
*A23N 12/06* (2006.01)

(56) References Cited

U.S. PATENT DOCUMENTS

| | | | |
|---|---|---|---|
| 7,500,426 B2 * | 3/2009 | Zittel | A23L 3/185 134/132 |
| 8,087,348 B2 | 1/2012 | Maupin et al. | |
| 8,776,674 B2 | 7/2014 | Maupin et al. | |
| 9,993,103 B2 * | 6/2018 | Kim | A23C 20/00 |

* cited by examiner

METHOD AND APPARATUS FOR CONTINUOUS PRESSURE COOKING

FIELD OF THE INVENTION

The present disclosure relates generally to the art of pressure cooking product. More specifically, it relates to a method and apparatus for continuously pressure cooking product.

BACKGROUND OF THE INVENTION

There are a number of different designs for commercial pressure cookers. One successful design is a pressurized rotary cooker, such as that described in U.S. Pat. No. 6,105,485, Zittel, hereby incorporated by reference. That design provides for a rotary blancher that is sealed such that it can be positively pressurized during operation to a pressure greater than the ambient pressure outside the blancher to increase food product heating speed and efficiency. The blancher (also called a pressure cooking section) has a sealed housing, a sealed food product inlet, and a sealed food product outlet all for enabling an atmosphere inside the blancher to be positively pressurized. A heat transfer fluid, such as a heated gas, a heated vapor, a heated liquid, or a combination thereof is introduced into the blancher to heat the food product inside the blancher. During operation, food products are continuously or substantially continuously introduced into the blancher through the food product inlet, continuously or substantially continuously processed by the blancher, and thereafter continuously or substantially continuously discharged from the blancher through the food product outlet.

Another design is shown in U.S. Pat. No. 8,087,348 and U.S. Pat. No. 8,776,674, both Maupin et al., both of which are hereby incorporated by reference. The design provides for a pressure vessel (also called a pressure cooking section) defining a compartment having an inlet end for receiving food product and an outlet end for discharging food product, an open-top screen mounted within the compartment and movable relative to the compartment between a first position, for food processing, and a second position, to facilitate cleaning, a rotatable auger mounted such that at least a portion of the auger is within the screen, the auger being operable to advance food product within the compartment from the inlet end of the pressure vessel toward the outlet end, and a transfer mechanism including a conduit in communication with the compartment, a fluid discharge positioned substantially within the conduit, and a pressurized fluid source in communication with the fluid discharge and operable to propel a fluid through the fluid discharge to move food product through the conduit.

Many prior art pressure cookers provided for an abrupt change in pressure/temperature to the product because the product was transferred from a low pressure/temperature area to the cooker which was a high pressure/temperature state. Then, after cooking the product again underwent an abrupt change in pressure and/or temperature because the product was transferred from the high pressure/temperature cooking section to a low pressure/temperature output section. Continuous cookers in particular provided abrupt pressure/temperature changes to product because the product moved continuously through the system.

Prior art continuous pressure cookers generally providing for transferring product into and out of a pressure cooking section using controllable valves at the input and output. Initially both valves are closed and the product staged for input (near the input valve. Then a valve at the entrance to an input spool chamber (isolating chamber) is opened to allow product into an un-pressurized spool chamber. The valve is closed after product is in the un-pressurized spool chamber. This means the product is in the spool chamber, but still not pressurized. A valve disposed between the spool chamber and the pressurized cooking section is opened to release the product into the pressurized cooking vessel. This thermally shocks the product. The lower valve closes so both valves are again closed, and then the spool section is vented (for safety reasons) before the input valve is again opened. These steps are performed rapidly in the prior art.

The discharge of product from prior art continuous pressure cookers is similarly accomplished. An output spool section has valves disposed between the spool section and the cooking section, and between the spool section and the output section. Initially both valves closed and the product is staged in the cooking section for being provided to the output spool section. Then, the valve between the cooking section and output spool section is opened, to allow product from pressure vessel to move into the un-pressurized spool chamber. Thus, the product abruptly goes to a chamber a temperature and pressure lower than that of the cooking section. While the pressure in the output spool section equalizes with the pressure in the cooking section, there change does have an effect on product. Next, the valve between the cooking section and output spool section is closed and the pressure in the spool section is slowly vented and cooling water added. The valve between the spool section and the output section is opened to release product, and then the valve is closed so that both valves are again closed.

Prior art pressure cookers have abrupt temperature/pressure changes and were used primarily to cook products that were relatively durable, and could withstand the relatively rapid decompression at the discharge of product (such as from a continuous rotary valve), or the slight decompression that comes with an isolating chamber. Indeed, depressurization has been used in the prior art to peel products, and produce and fracture some products such as pinto beans for refried beans.

However, the same forces that can be used to peel or fracture products can damage products that are fragile and/or have easily damaged skins. For examples whole dry beans cooked in prior art continuous pressure cookers result in split beans or poor product integrity because water under the skin of the beans can to flash to steam during depressurization.

Accordingly, a continuous pressure cooker that provides for less abrupt changes in pressure and/or temperature as the product enters and/or exits the pressurized cooking section is desirable. Preferably, such a continuous pressure cooker will be able to cook products that are fragile and/or have easily damaged skins.

SUMMARY OF THE PRESENT INVENTION

According to a first aspect of the disclosure a continuous pressure cooker for cooking product includes a pressure cooking section, an isolating chamber, first and second product and fluid valves, an output section, a source of pressurized fluid, and a first fluid valve. The first product and fluid valve is disposed between the pressure cooking section and the isolating chamber and provides a first controllable product and fluid flow path between the pressure cooking section and the isolating chamber. The second product and fluid valve is disposed between the isolating chamber and the output section, and provides a second controllable product and fluid flow path between the isolating chamber and the output section. The first fluid valve is disposed between the source of pressurized fluid and the isolating chamber, and provides a controllable pressurizing fluid flow path between the source of pressurized fluid and the isolating chamber.

The continuous pressure cooker includes a source of cooling fluid, and a second fluid valve is disposed between the source of cooling fluid and the isolating chamber, and provides a controllable cooling fluid flow path between the source of cooling fluid and the isolating chamber in one alternative.

The continuous pressure has a third fluid valve disposed between the isolating chamber and a lower pressure region that provides a controllable depressurization fluid flow path between the isolating chamber and the lower pressure region in another alternative.

A filter is disposed in the controllable depressurization fluid flow path in one embodiment.

The lower pressure region is one of the output section, an area of ambient pressure, and external to the machine in various embodiments.

The continuous pressure cooker has a controller connected to one or more of the first, second, third and fourth product and fluid valves, and/or the first and second fluid valves in various alternatives.

The source of pressurized fluid is the pressure cooking section in another alternative.

The continuous pressure cooker has a product staging area between the pressure cooking section and the first product and fluid valve, to accumulate product when the first product and fluid valve is closed in one embodiment.

The continuous pressure cooker also has an input section, an input isolating chamber, third and fourth product and fluid valves, an input product staging area, and a fourth fluid valve in various embodiments. The third product and fluid valve is between the input section and the input isolating chamber, and provides a third controllable product and fluid flow path between the input section and the input isolating chamber. The input product staging area is between the input section and the third product and fluid valve and accumulates product when the third product and fluid valve is closed. The fourth product and fluid valve is between the isolating chamber and the pressure cooking section to provide a fourth controllable product and fluid flow path between the input isolating chamber and the pressure cooking section. The fourth fluid valve is disposed between the source of pressurized fluid and the input isolating chamber, and provides a controllable pressurizing fluid flow path between the source of pressurized fluid and the input isolating chamber in various embodiments.

The continuous pressure cooker has a fifth fluid valve disposed between the input isolating chamber and lower pressure region that provides a second controllable depressurization fluid flow path between the input isolating chamber and the second lower pressure region in one alternative.

According to a second aspect of the disclosure a method of continuously pressure cooking product includes providing the product to a pressure cooking section and pressure cooking the product and pressurizing an isolating chamber to be substantially the same pressure as the pressure cooking section. Then opening a first controllable product and fluid flow path between the pressure cooking section and the isolating chamber to allow product to enter the isolating chamber. Then closing the first controllable product and fluid flow path so that the product is isolated in the isolating chamber. Then opening a second controllable product and fluid flow path between the isolating chamber and an output section, to allow the product to exit the isolating chamber and enter the output section, and then closing the second controllable product and fluid flow path between the isolating chamber and an output section.

While the product is isolated in the isolating chamber cooling fluid is provided to the isolating chamber in one alternative.

While the product is isolated in the isolating chamber the isolating chamber is depressurized in another alternative.

Depressurizing the isolating chamber includes preventing the product from leaving the isolating chamber in one embodiment.

Depressurizing the isolating chamber includes depressurizing the isolating chamber to have the same pressure as one of the output section and ambient pressure in various embodiments.

Pressurizing the isolating chamber to be substantially the same pressure as the pressure cooking section includes opening a fluid flow path between the pressure cooking section and the isolating chamber in one alternative.

The method also includes accumulating the product near the isolating chamber before opening the first controllable product and fluid flow path in another alternative.

Providing the product to a pressure cooking section includes, providing the product to an input section and pressurizing an input isolating chamber to be substantially the same pressure as the pressure cooking section in various embodiments. After the input isolating chamber is substantially the same pressure as the pressure cooking section a third controllable product and fluid flow path is opened between the input section and the input isolating chamber, to allow product to enter the input isolating chamber. After the product has entered the input isolating chamber the third controllable product and fluid flow path is closed so that the product is isolated in the input isolating chamber. After the product has been isolated in the input isolating chamber a fourth controllable product and fluid flow path is opened between the isolating chamber and the pressure cooking section, to allow the product to exit the input isolating chamber and enter the pressure cooking section.

After the product has exited the input isolating chamber the input isolating chamber is depressurized in one alternative.

Product is accumulated near the input isolating chamber before opening the third controllable product and fluid flow path in another alternative.

Other principal features and advantages of will become apparent to those skilled in the art upon review of the following drawings, the detailed description and the appended claims.

Figure 1:
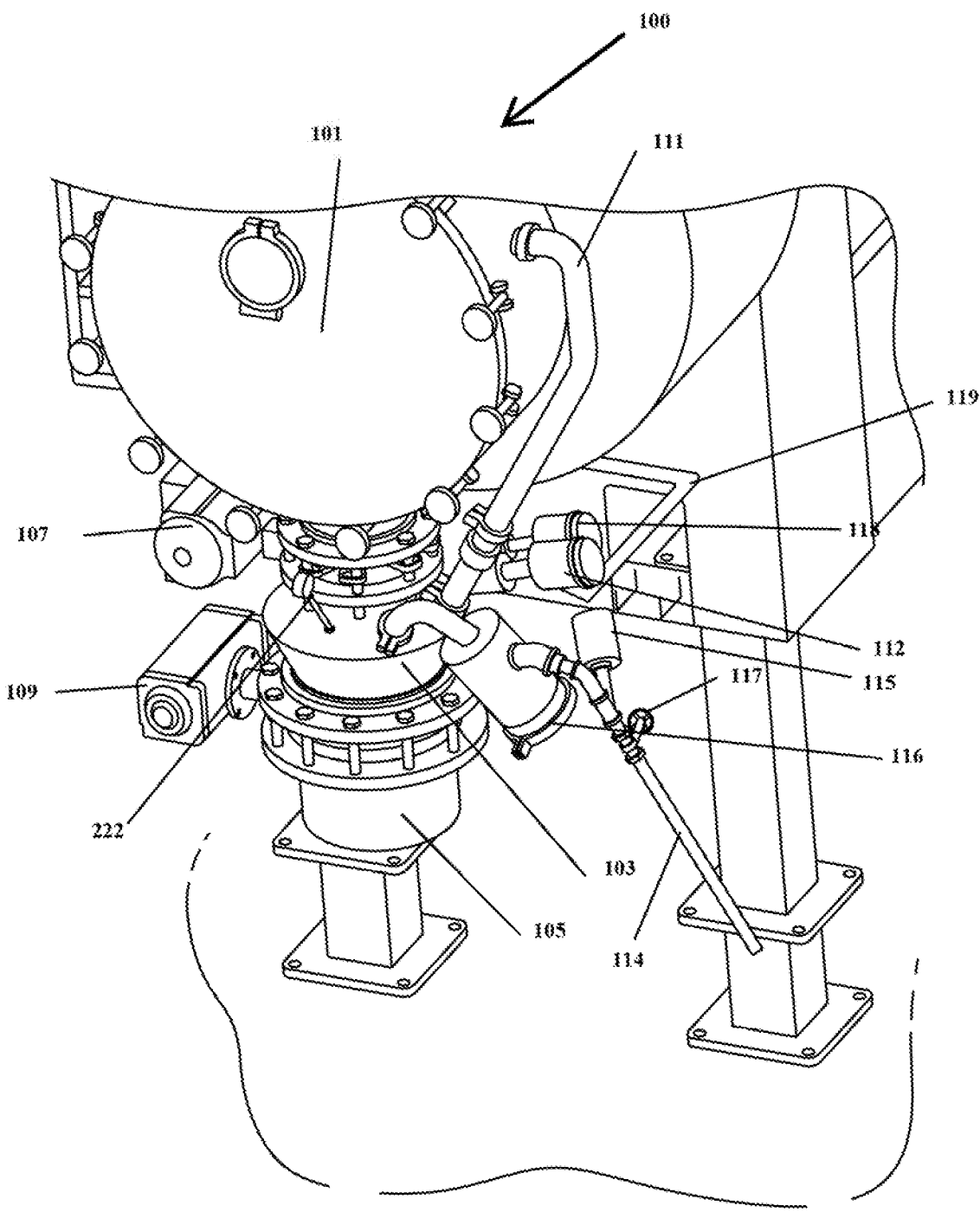
FIG. 1 is a diagram of the outlet end of a continuous pressure cooker.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to particular continuous pressure cookers and components, it should be understood at the outset that the invention can also be implemented with other continuous pressure cookers and other components. The invention can be implemented on cookers such as those shown in U.S. Pat. Nos. 6,105,485, 8,087,348 and 8,776,674, or using other cookers. The cooker below can be that of these patents, accept as described below.

Generally, the invention provides for a continuous pressure cooker that can provide pressure and/or non-abrupt temperature equalization for product moving from an input section into a pressure cooking section, and from the pressure cooking section to an output section. Pressure cooking section, as used herein, refers to a section that provides a temperature and pressure sufficiently high to cook product. Examples of pressure cooking sections include rotary screw blanchers and rotary blanchers. Output section, as used herein, refers to a section of a pressure cooker that operates a lesser pressure and/or temperature than the pressure cooking section, and to which product is provided after being cooked. An output section can simply by a pipe or transit area, or it can be a vessel be used to cool product. Input section, as used herein, refers to a section such as a pipe or staging area of a pressure cooker that operates a lesser pressure and/or temperature than the pressure cooking section, and from which product is provided to the of pressure cooking section to be cooked.

An isolating chamber is provided between the input section and the pressure cooking section. A product and fluid valve is disposed between the input section and the isolating chamber. The product and fluid valve provides a controllable product and fluid flow path between the input section and the isolating chamber. Isolating chamber, as used herein, refers to a chamber between a higher pressure and/or temperature section and a lower pressure and/or temperature section. Product and fluid valve, as used herein, refers to a valve that can controllably allow at least product and fluid to flow there through. Controllable product and fluid flow path, as used herein, refers to a flow path through which at least product and fluid can flow, and can be controlled to be closed, open, and/or partially open. A valve is disposed between sections when it is in a flow path between the sections, and it can be the only element between the sections or there can be other elements between the sections.

When product enters the input isolating chamber it is at a lower (than the cooker) pressure, such as ambient pressure. The product and fluid valve between the input section and the isolating chamber is closed, isolating the product in the isolating chamber. Then, a fluid valve between the cooking section and the input isolating chamber is opened, to controllably raise the pressure in the input isolating chamber (which has product therein) to be equal to the pressure in the pressure cooking section. The fluid valve is part of a controllable pressurizing fluid flow path. Alternatives provides for using a source of high pressure other than the pressure cooking section to pressurize the input isolating chamber. Controllable pressurizing fluid flow path, as used herein, refers to a flow path through which at least fluid can flow to pressurize a chamber or vessel, and can be controlled to be closed, open, and/or partially open. Fluid valve, as used herein, refers to a valve that can controllably allow at least fluid to flow there through. Using the controllable pressurizing fluid flow path allows the pressure to be raised in the isolating chamber in a controlled manner to avoid damaging product.

After the pressure in the isolating chamber reaches about the pressure in the pressure cooking section, a second product and fluid valve disposed between the isolating chamber and the pressure cooking section is opened to provide a controllable product and fluid flow path between the input section and the isolating chamber. Product exits the isolating chamber and enters the pressure cooking section to be pressure cooked.

After the product has exited the isolating chamber, the product and fluid valve between the isolating chamber and the pressure cooking section is closed. At this stage the isolating chamber does not contain product, and is at the pressure of the cooking section. A second fluid valve is used to release pressure from the isolating chamber, bringing it back down to ambient pressure (or the pressure of the input section). The fluid valve is part of a controllable depressurization fluid flow path. Fluid valve, as used herein, refers to a valve that can controllably allow at least fluid to flow there through. Controllable depressurization fluid flow path, as used herein, refers to a flow path through which at least fluid can flow to depressurize a chamber and/or a vessel, and can be controlled to be closed, open, and/or partially open.

Once the pressure between the input section and the isolating chamber has equalized, the process can begin again with the opening of the product and fluid valve disposed between the input section and the isolating chamber.

Product exits the pressurized cooking section in a similar manner using an output isolating chamber and controlled valves to equalize pressure in a controlled manner. The output isolating chamber is provided between the pressure cooking section and the output section. A product and fluid valve is disposed between the pressure cooking section and the output isolating chamber, and another product and fluid valve is disposed between the output isolating chamber and the output section. These product and fluid valves provide controllable product and fluid flow paths between the pressure cooking section and the output isolating chamber, and another between the output isolating chamber and the output section.

Prior to product entering the output isolating chamber the chamber is at a lower (than the cooker) pressure, such as ambient pressure. A fluid valve between the cooking section and the input isolating chamber is opened, to raise the pressure in the output isolating chamber (which does not have product therein) to be equal to the pressure in the pressure cooking section. Alternatives provides for using a source of high pressure other than the pressure cooking section to pressurize the isolating chamber.

The product and fluid valve between the cooking section and the isolating chamber is opened, allowing cooked product to enter the isolating chamber without a pressure change. After the cooked product has moved into the isolating chamber the product and fluid valve between the cooking section and the isolating chamber is closed, isolating the cooked product. Then, another fluid valve is used to release pressure from the output isolating chamber, preferably reducing it to ambient pressure (or the pressure of the output section). This fluid valve is part of a controllable depressurization fluid flow path. By controllably depressurizing the isolating chamber, product damage is reduced.

After the isolating chamber pressure is reduced, the product and fluid valve between the isolating chamber and the output section is opened, allowing cooked product to leave the isolating chamber and enter the output section without a pressure change.

After the cooked product has moved out of the isolating chamber, the product and fluid valve between the isolating chamber and output section is closed. At this stage the output isolating chamber does not contain product, and is at the pressure of the output section. Then the process can begin again with the pressurizing of the isolating chamber.

One embodiment provides that a source of cooling fluid be provided, along with a fluid valve disposed between the source of cooling fluid and the isolating chamber to provide a controllable cooling fluid flow path between the source of cooling fluid and the isolating chamber. This allows for controllably cooling the cooked product that is in the isolating chamber by opening the cooling fluid valve while the cooked product is isolated in the isolating chamber. Cooling fluid, as used herein, refers to fluid at a lower temperature and/or pressure than fluid used to cook product. Controllable cooling fluid flow path, as used herein, refers to a flow path through which at least fluid can flow to cool product, a chamber and/or a vessel, and can be controlled to be closed, open, and/or partially open.

A controller is preferably provided and connected to each valve to control the opening and closing of the various valves. Alternatives provide for one controller controlling less than all of the valves. Controller, as used herein, refers to hardware and\or software, used to control one or more devices, and can be located in a single location or distributed over several locations.

A product staging area is preferably provided before the input isolating chamber to allow for product to quickly enter the input isolating chamber when the valve is opened. This staging area can be part of the input section, part of the input isolating chamber, or between the input section and the valve. Also, a product staging area is preferably provided before the output isolating chamber to allow for product to quickly enter the output isolating chamber when that valve is opened. This staging area can be part of the cooking section, part of the output isolating chamber, or between the cooking section and the valve. Product staging area, as used herein, refers to a location where product can accumulate before being transferred to a subsequent location, and can allow a continuous cooker to have intermittent product movement.

Turning now to FIG. 1, a portion of a continuous pressure cooker 100 includes a pressure cooking section 101, a isolating chamber 103 and an output section 105. A product and fluid valve 107 is disposed between pressure cooking section 101 and isolating chamber 103. A product and fluid valve 109 is disposed between isolating chamber 103 and output section 105. Valves 107 and 109 are controlled as described above to control product and fluid leaving pressure cooking section 101 and entering isolating chamber 103, and leaving isolating chamber 103 and entering output section 105.

Pressurization of isolating chamber 103 as described above is accomplished using a pressurizing line 111 and a fluid valve 112. Pressurizing line 111 connects valve 112 to pressure cooking section 101. When valve 112 is open the pressure in isolating chamber 103 becomes that of cooking section 101. When valve 112 is closed, the pressure in isolating chamber 103 can be different than the pressure of cooking section 101. Alternatives provide for using a different source of high pressure.

Depressurizing of isolating chamber 103 is accomplished using a pressure relief line 114 vented to ambient pressure, in cooperation with a valve 115. A filter 116 can also be provided. A manual valve 117 as shown can also be used. Cooling is provided via a cooling fluid valve 118 and a source of cooling fluid 119. The preferred cooling fluid is clean water. A pressure gauge 222 is preferably provided. The cooling path and pressurization path, and depressurization can be partially shared and all can enter isolating chamber 103 using the same pipe.

Figure 3:
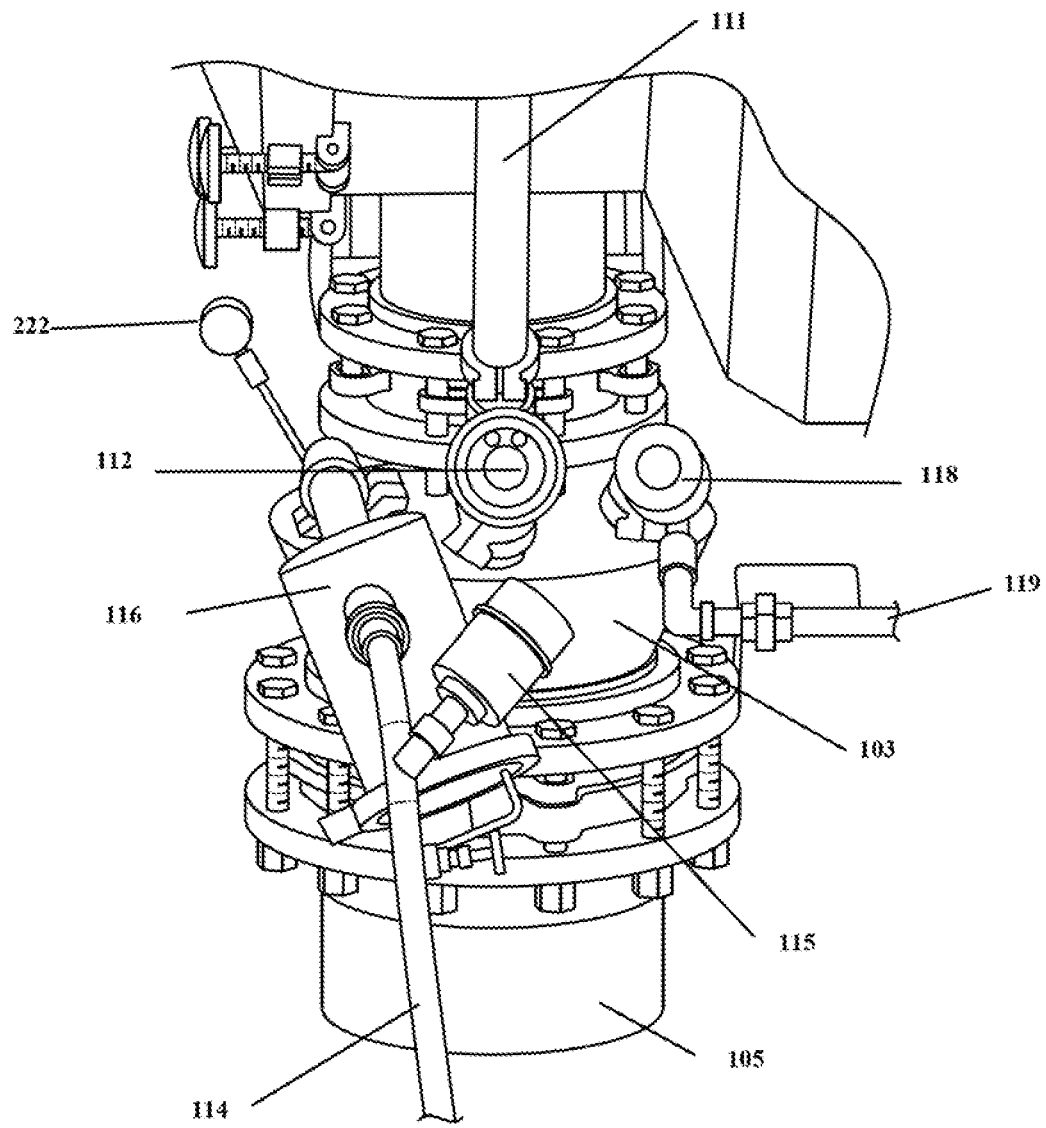
FIG. 3 is a diagram of a close up side view of portions of FIG. 1.

A close up side view of isolating chamber 103 and other components may be seen in FIG. 3. Pressurizing line 111 and fluid valve 112, along with pressure relief line 114, valve 115, filter 116, and cooling fluid valve 118 and a source of cooling fluid 119 are shown. Pressure gauge 222 is also provided. Filter 116 is used with a fluid valve to can prevent product from clogging valves or lines. Other filters serve a similar purpose.

Valves 112, 115, and 118 are controlled to pressurize, depressurize and cool isolating chamber 103 as described above.

Figure 2:
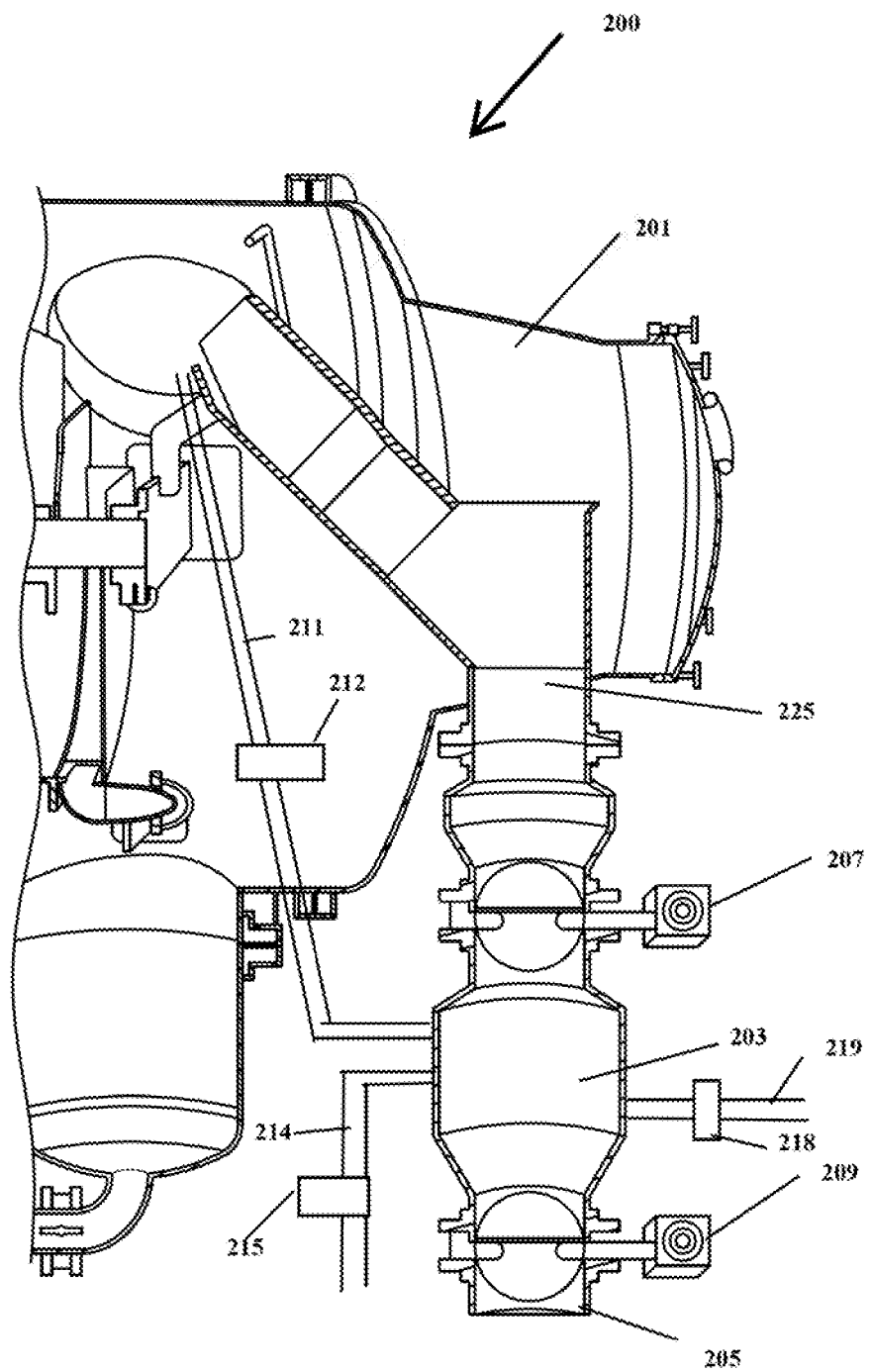
FIG. 2 is a diagram of the outlet end of a continuous pressure cooker.

Turning now to FIG. 2, a portion of a continuous pressure cooker 200 in accordance with another embodiment includes a pressure cooking section 201, an isolating chamber 203 and an output section 205. A product and fluid valve 207 is disposed between pressure cooking section 201 and isolating chamber 203. A product and fluid valve 209 is disposed between isolating chamber 203 and output section 205. Valves 207 and 209 are controlled as described above to control product and fluid leaving pressure cooking section 201 and entering isolating chamber 203, and leaving isolating chamber 203 and entering output section 205.

Pressurization of isolating chamber 203 is accomplished using a pressurizing line 211 and a fluid valve 212. Fluid valve 212 is omitted in some embodiments. Pressurizing line 211 connects valve 212 to pressure cooking section 201. When valve 212 is open the pressure in isolating chamber 203 becomes that of cooking section 201. When valve 212 is closed, the pressure in isolating chamber 203 can be different than the pressure of cooking section 201. Alternatives provide for using a different source of high pressure.

Depressurizing of isolating chamber 203 is accomplished using a pressure relief line 214 with a valve 215. A filter can also be provided. Cooling is provided via a cooling fluid valve 218 and a source of cooling fluid 219. The preferred cooling fluid is water.

A product staging area 225 is providing to accumulate product while valve 207 is closed.

Figure 5:
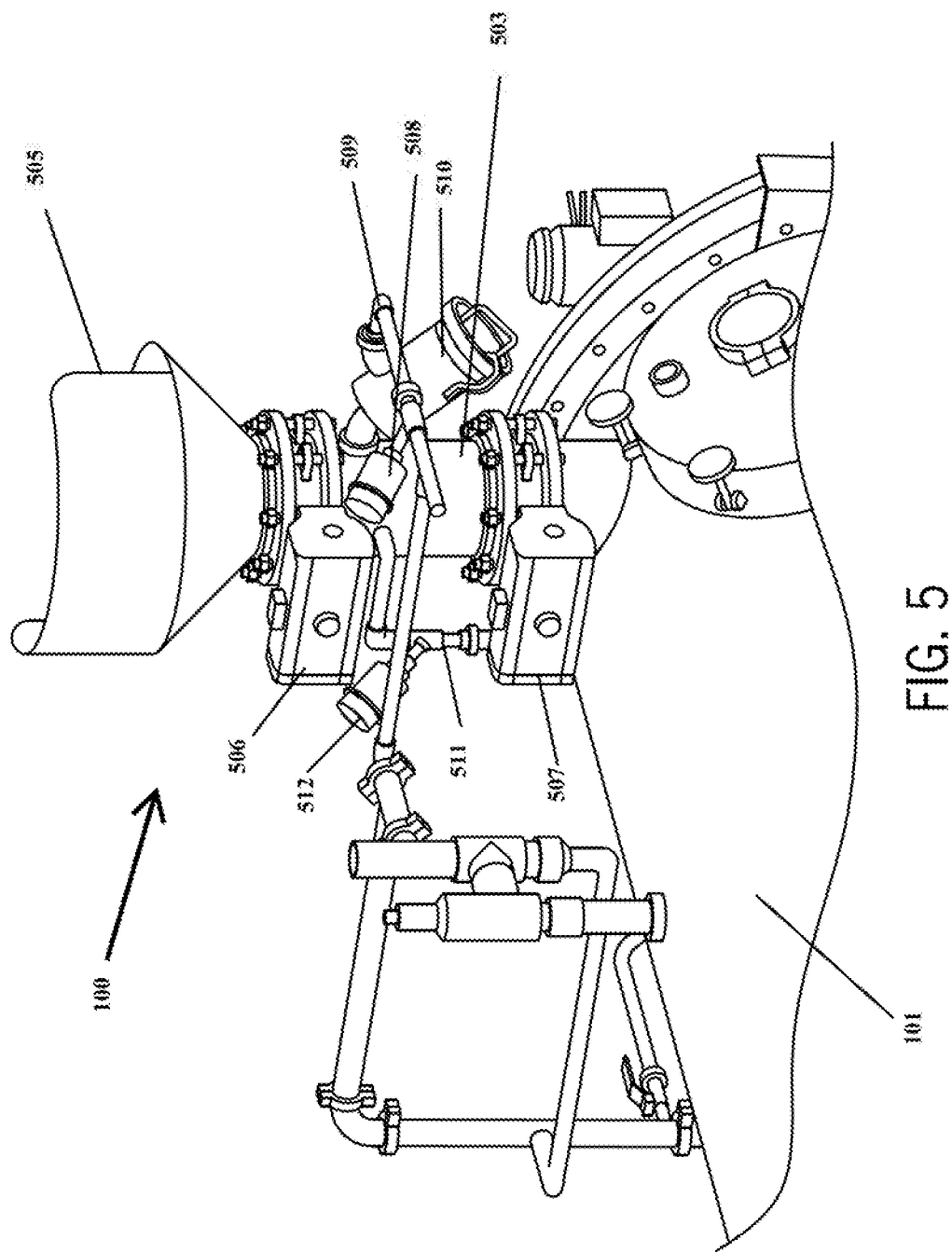
FIG. 5 is a diagram of the input end of a continuous pressure cooker.

Turning now to FIG. 5, an inlet portion of continuous pressure cooker 100 includes pressure cooking section 101, an input isolating chamber 503 and an input section 505 (which is also a product staging area). A product and fluid valve 506 is disposed between input section 505 and isolating chamber 103. A product and fluid valve 507 is disposed between isolating chamber 503 and pressure cooking section 101. Valves 506 and 507 are controlled to control product and fluid leaving input section 405 and entering isolating chamber 503, and leaving isolating chamber 503 and entering cooking section 101, as described above.

Pressurization of isolating chamber 503 is accomplished using a pressurizing line 511 and a fluid valve 512. Pressurizing line 511 connects valve 512 to pressure cooking section 501. When valve 512 is open the pressure in isolating chamber 203 is that of cooking section 101. When valve 512 is closed, the pressure in isolating chamber 503 can be different than the pressure of cooking section 101. Alternatives provide for using a different source of high pressure. Depressurizing of isolating chamber 503 is accomplished using a pressure relief line 509 with a valve 508. A filter 510 may also be provided. Fluid valves 508 and 512 are controlled as described above.

Figure 4:
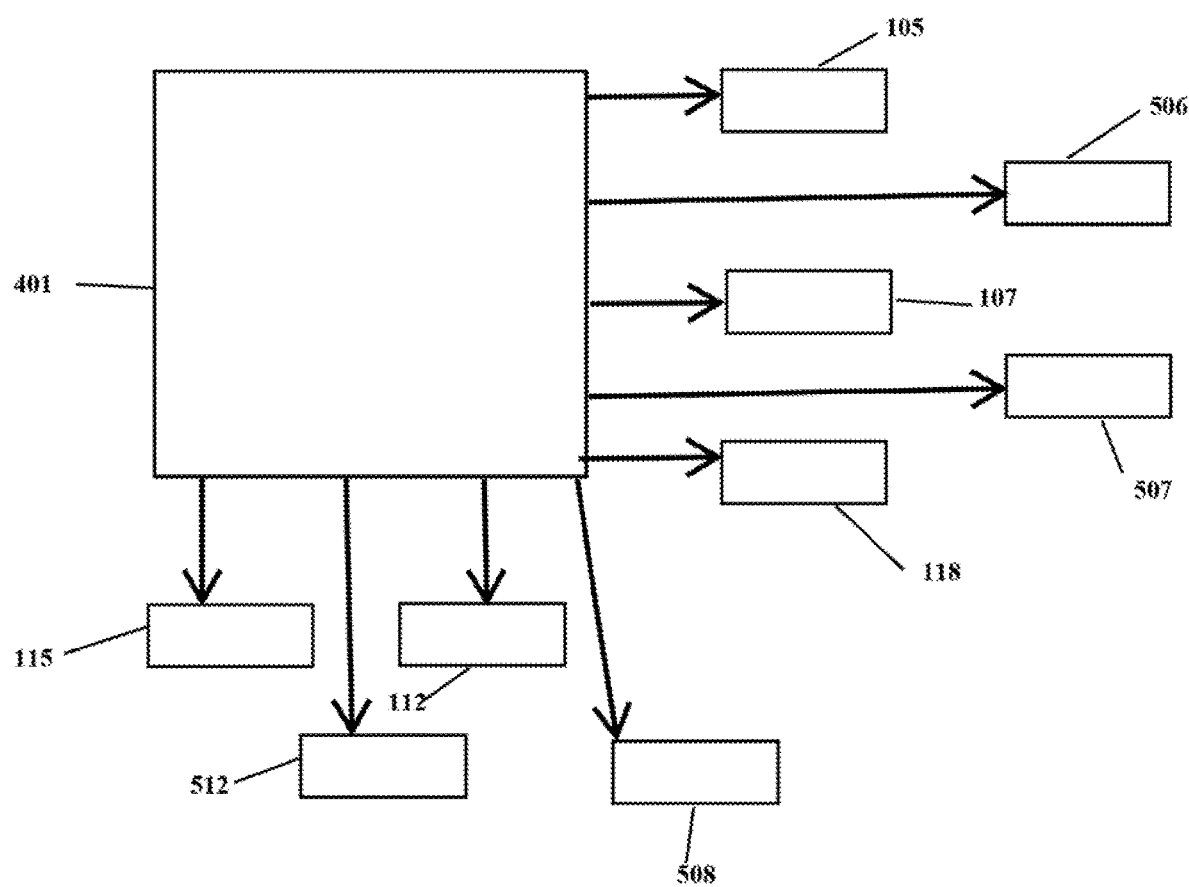
FIG. 4 is a diagram of controller for a continuous pressure cooker.

FIG. 4 shows a controller 401 connected to control each of product and fluid valves 107, 109, 506 and 507, along with fluid valves 112, 115, 118, 508 and 512. Controller 101 effects the opening and closing of valves as described above and preferably does so using a user adjusted timing program and/or feedback. For example, if more fragile products are being cooked controller 401 can provide longer equalization times, to reduce the stress on the product. Also, controller 401 can advance to the next step when a pressures indicate pressure equalization has been reached. The preferred embodiment provides that controller 101 include a timer and stores an adjustable timed value for the time between changing the state of a given valve and changing the state of the valve for the subsequent operation. For example, a time can be defined for the time between opening product and fluid valve 107 and closing opening product and fluid valve 107, and between closing product and fluid valve 107 and opening fluid valve 112, and so forth. Alternatives provide for some or all of the times to be factory set.

Numerous modifications may be made to the present disclosure which still fall within the intended scope hereof. Thus, it should be apparent that there has been provided a method and apparatus for continuous pressure cooking that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The invention claimed is:

1. A continuous pressure cooker for cooking product having a pressure vessel, comprising:
   a pressure cooking section;
   an isolating chamber;
   a first product and fluid valve disposed between the pressure cooking section and the isolating chamber to provide a first controllable product and fluid flow path between the pressure cooking section and the isolating chamber;
   an output section;
   a second product and fluid valve disposed between the isolating chamber and the output section to provide a second controllable product and fluid flow path between the isolating chamber and the output section;
   a source of pressurized fluid; and
   a first fluid valve disposed between the source of pressurized fluid and the isolating chamber to provide a controllable pressurizing fluid flow path between the source of pressurized fluid and the isolating chamber.

2. The continuous pressure cooker of claim 1, further comprising a source of cooling fluid and a second fluid valve disposed between the source of cooling fluid and the isolating chamber to provide a controllable cooling fluid flow path between the source of cooling fluid and the isolating chamber.

3. The continuous pressure cooker of claim 2, further comprising a third fluid valve disposed between the isolating chamber and a lower pressure region, to provide a controllable depressurization fluid flow path between the isolating chamber and the lower pressure region.

4. The continuous pressure cooker of claim 3, further comprising a filter disposed in the controllable depressurization fluid flow path.

5. The continuous pressure cooker of claim 4, wherein the lower pressure region is one of the output section, an area of ambient pressure, and external to the machine.

6. The continuous pressure cooker of claim 5, further comprising a controller connected to at least one of the first product and fluid valve, the second product and fluid valve, the first fluid valve, the second fluid valve, and the third fluid valve, to selectively control the at least one of the first product and fluid valve, the second product and fluid valve, the first fluid valve, the second fluid valve, and the third fluid valve.

7. The continuous pressure cooker of claim 6, wherein the source of pressurized fluid is the pressure cooking section.

8. The continuous pressure cooker of claim 6, further comprising a product staging area disposed between the pressure cooking section and the first product and fluid valve to accumulate product when the first product and fluid valve is closed.

9. The continuous pressure cooker of claim 6, further comprising:
   an input section;
   an input isolating chamber;
   a third product and fluid valve disposed between the input section and the input isolating chamber to provide a third controllable product and fluid flow path between the input section and the input isolating chamber;
   an input product staging area disposed between the input section and the third product and fluid valve to accumulate product when the third product and fluid valve is closed;
   a fourth product and fluid valve disposed between the isolating chamber and pressure cooking section to provide a fourth controllable product and fluid flow path between the input isolating chamber and the pressure cooking section; and
   a fourth fluid valve disposed between the source of pressurized fluid and the input isolating chamber to provide a controllable pressurizing fluid flow path between the source of pressurized fluid and the input isolating chamber.

10. The continuous pressure cooker of claim 9, further comprising a fifth fluid valve, disposed between the input isolating chamber and a second lower pressure region, to provide a second controllable depressurization fluid flow path between the input isolating chamber and the second lower pressure region.

11. A method of continuously pressure cooking product, comprising:
   providing the product to a pressure cooking section and pressure cooking the product;
   pressurizing an isolating chamber to be substantially the same pressure as the pressure cooking section;
   after the isolating chamber is substantially the same pressure as the pressure cooking section opening a first controllable product and fluid flow path between the pressure cooking section and the isolating chamber to allow product to enter the isolating chamber;
   after the product has entered the isolating chamber closing the first controllable product and fluid flow path so that the product is isolated in the isolating chamber;
   after the product has been isolated in the isolating chamber opening a second controllable product and fluid flow path between the isolating chamber and an output section, to allow the product to exit the isolating chamber and enter the output section; and after the product has entered the output section closing the second controllable product and fluid flow path between the isolating chamber and an output section.

12. The method of claim 11, further comprising while the product is isolated in the isolating chamber providing a cooling fluid to the isolating chamber.

13. The method of claim 12, further comprising while the product is isolated in the isolating chamber depressurizing the isolating chamber.

14. The method of claim 13, wherein depressurizing the isolating chamber includes preventing the product from leaving the isolating chamber.

15. The method of claim 14, wherein depressurizing the isolating chamber includes depressurizing the isolating chamber to have the same pressure as one of the output section and ambient pressure.

16. The method of claim 15, wherein pressurizing the isolating chamber to be substantially the same pressure as the pressure cooking section includes opening a fluid flow path between the pressure cooking section and the isolating chamber.

17. The method of claim 6, further comprising accumulating the product near the isolating chamber before opening the first controllable product and fluid flow path.

18. The method of claim 11, wherein providing the product to a pressure cooking section comprises:

providing the product to an input section;

pressurizing an input isolating chamber to be substantially the same pressure as the pressure cooking section;

after the input isolating chamber is substantially the same pressure as the pressure cooking section opening a third controllable product and fluid flow path between the input section and the input isolating chamber, to allow product to enter the input isolating chamber;

after the product has entered the input isolating chamber closing the third controllable product and fluid flow path so that the product is isolated in the input isolating chamber; and after the product has been isolated in the input isolating chamber opening a fourth controllable product and fluid flow path between the isolating chamber and the pressure cooking section, to allow the product to exit the input isolating chamber and enter the pressure cooking section.

19. The method of claim 18, further comprising, after the product exited the input isolating chamber depressurization the input isolating chamber.

20. The method of claim 19, further comprising accumulating the product near the input isolating chamber before opening the third controllable product and fluid flow path.

* * * * *